(12) United States Patent
Cox

(10) Patent No.: US 7,296,599 B2
(45) Date of Patent: Nov. 20, 2007

(54) PNEUMATIC POWDER TRANSPORT SYSTEM

(75) Inventor: Brian D. Cox, Round Rock, TX (US)

(73) Assignee: 3D Systems, Inc., Rock Hill, SC (US)

( * ) Notice: Subject to any disclaimer, the term of this patent is extended or adjusted under 35 U.S.C. 154(b) by 181 days.

(21) Appl. No.: 11/096,143

(22) Filed: Mar. 31, 2005

(65) Prior Publication Data

US 2006/0219315 A1    Oct. 5, 2006

(51) Int. Cl.
*B65B 1/04*    (2006.01)
(52) U.S. Cl. .......................... 141/67; 141/198
(58) Field of Classification Search ............ 141/67, 141/65, 98, 114, 70, 286; 383/114; 222/185.1, 222/181.1, 195
See application file for complete search history.

(56) References Cited

U.S. PATENT DOCUMENTS

| | | | |
|---|---|---|---|
| 2,707,132 A | * | 4/1955 | Baresch .................... 406/14 |
| 4,149,755 A | * | 4/1979 | Handleman et al. ......... 406/90 |
| 4,182,386 A | | 1/1980 | Alack |
| 4,247,508 A | | 1/1981 | Housholder |
| 4,863,538 A | | 9/1989 | Deckard |
| 4,944,817 A | | 7/1990 | Bourell et al. |
| 5,132,143 A | | 7/1992 | Deckard |
| 5,271,439 A | | 12/1993 | Alack |
| 5,348,063 A | | 9/1994 | Handleman |
| 5,544,951 A | * | 8/1996 | Alack ..................... 366/163.2 |
| 5,660,478 A | | 8/1997 | Alack et al. |

FOREIGN PATENT DOCUMENTS

DE    201 07 262 U1 * 10/2001
WO    03-26986 A2    4/2003

* cited by examiner

*Primary Examiner*—Steven O. Douglas
(74) *Attorney, Agent, or Firm*—Ralph D'Alessandro; William A. Simons

(57) ABSTRACT

A method and apparatus for pneumatic powder transfer from a powder supply container to applications such as laser sintering systems. The method and apparatus use both constant and cyclic flows of a pressurized gas to fluidize and convey powders without the need for any tilting unloading stands, vibration or other mechanical working of the powder.

17 Claims, 5 Drawing Sheets

PNEUMATIC POWDER TRANSPORT SYSTEM

BACKGROUND OF THE INVENTION

This invention relates to a material handling apparatus, and more particularly to a closed system for handling powdered or fine granular materials, the system enabling the powdered material to be readily unloaded from a container substantially without the discharge or escape of dust. The invention can be used for any application in which it is desired to transfer a bulk supply of a powder into a receiving vessel or into a process of use. A particular useful application that will be described herein is the use of the invention for bulk feeding of powder into a laser sintering process.

In handling powders, such as paint pigments, cement, diatomaceous earth, and chemical powders, both organic and inorganic, it has long been a problem to effect rapid and controlled loading of the material into its container and the rapid unloading of the material without dispensing substantial quantities of dust into the atmosphere. For example, in filling paper bags, drums, or other containers with a powder, substantial quantities of dust are often generated. While this dust can oftentimes be collected or otherwise controlled at the factory in which the bags are filled, the end use of the bags may result in the excessive release of dust that cannot readily be controlled. This release of some types of dust, such as a toxic dust, not only creates a housekeeping problem in the area of use, but the toxic dust may constitute a health hazard to many workers and other personnel in the general vicinity.

As disclosed in U.S. Pat. Nos. 4,182,386 and 5,271,439 containers are now commercially available from Semi-Bulk Systems, Inc. of St. Louis, Mo., for receiving, transporting and unloading "semi-bulk" quantities (e.g., 2000-4000 pounds or more) of powdered or finely divided granular material. Generally, such containers have a rigid molded plastic pallet base and a flexible plastic film bag secured thereto. Methods and apparatus for filling such bags while minimizing generated dust have been described, with one example described in aforementioned U.S. Pat. No. 4,182,386.

A useful system for unloading powdered materials from such flexible containers is described in U.S. Pat. No. 5,271,439. Because many commercial powdered materials may agglomerate and form lumps during transport and storage, the system described in U.S. Pat. No. 5,271,439 employs a joint strategy of vibration and mechanical squeezing of the flexible container while introducing compressed gas into the flexible container to fluidize the powdered material and assist it to flow out of the base of the container. Further, the base of the flexible container is sloped toward one side to help the fluidized powder flow toward the outlet line. In some implementations the entire flexible container may even be tilted to aid flow.

The requirements of vibration, squeezing, and tilting of the flexible container to ensure adequate unloading of the contents lead to a mechanically complex and expensive base and frame for the container and requires that the container must be flexible. Thus there is a need for a much simpler implementation of powder unloading that has less mechanical complexity and is more affordable.

An important application requiring a supply of powder feed is the use of laser sintering technology to produce 3-dimensional articles from powder. By way of background, an example of a freeform fabrication technology is the selective laser sintering process practiced in systems available from 3D Systems, Inc., in which articles are produced from a laser-fusible powder in layerwise fashion. According to this process, a thin layer of powder is dispensed and then fused, melted, or sintered, by laser energy that is directed to those portions of the powder corresponding to a cross-section of the article. Conventional selective laser sintering systems, such as the Vanguard system available from 3D Systems, Inc., position the laser beam by way of an optics system using galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The computer based control system is programmed with information indicative of the desired boundaries of a plurality of cross-sections of the part to be produced. The laser may be scanned across the powder in raster fashion, with modulation of the laser affected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, an additional layer of powder is then dispensed, and the process repeated, with fused portions of later layers fusing to fused portions of previous layers (as appropriate for the article), until the article is complete.

Detailed description of the laser sintering technology may be found in U.S. Pat. Nos. 4,863,538; 5,132,143; and 4,944,817, all assigned to Board of Regents, The University of Texas System, and in U.S. Pat. No. 4,247,508 to Housholder, all specifically incorporated herein by reference in pertinent part.

Growing use of laser sintering technology, especially in limited run manufacturing and in the use of multiple machines in large service bureaus, has created a need for more automated means for feeding, removing, and recycling of the powders used. Automating powder recycling can significantly reduce manual handling of powders, reduce exposures to the powders, and improve the consistency of the powders being fed to the sintering apparatus. A compact and reliable automated system for feeding to, removing from, and recycling powders within laser sintering systems is described in co-pending patent application, Ser. No. 11/077,304, filed Mar. 9, 2005 and assigned to the assignee of the present invention. This application is specifically incorporated by reference herein in pertinent part.

The transfer of new or virgin powder into either the automated powder recycle system described in the aforementioned patent application Ser. No. 11/077,304 or directly into a laser sintering system can take place. What is needed then is a new powder transfer system with a powder container that is portable, but enclosed and therefore dust free, mechanically simple, reliable and lower in cost. These problems are solved in the design of the present invention.

BRIEF SUMMARY OF THE INVENTION

It is therefore an aspect of the instant invention to provide a reliable and mechanically simple method and system for unloading new or virgin powders from containers using a pneumatic powder transfer system via fluidization and conveying. The containers to be used can be either rigid or flexible.

It is another aspect of the instant invention that the pneumatic powder transfer system is used in conjunction with a laser sintering apparatus to produce three-dimensional articles.

It is another aspect of the instant invention that the pneumatic powder transfer system is used in conjunction with a powder processing unit that combines and blends powders for a laser sintering apparatus to produce three-dimensional articles.

It is a feature of the instant invention that the pneumatic powder transfer system uses both a continuous and an occasional higher pulse of compressed gas to effectively fluidize and convey powder.

It is another feature of the instant invention that the pneumatic powder transfer system uses a supplemental flow of compressed gas into the outlet stream to improve the transfer effectiveness of the system.

It is another feature of the instant invention that the pneumatic powder transfer system has a bottom shaped to slope downward to a central outlet for powder.

It is another feature of the instant invention that the pneumatic powder transfer system has a powder container can be either rigid or flexible and collapsible.

It is an advantage of the instant invention that powder can be transferred from a container without dispensing substantial quantities of dust into the atmosphere.

It is an advantage of the instant invention that the powder can be transferred using pneumatic methods only, without the need of any vibratory or other mechanical methods or the use of an unloading stand that elevates the powder container off of the floor.

It is another advantage of the instant invention that powder can be transferred from a container in an automated manner with minimal manual labor.

These and other aspects, features and advantages are achieved by the present invention by providing an apparatus for producing three-dimensional articles from a powder including at least a process chamber within the apparatus in which a layerwise build process is performed to produce three-dimensional objects; a feed line into the apparatus for feeding powder into the process chamber; a powder-processing unit connected to the feed line; and a pneumatic powder transfer system connected to the powder-processing unit for transporting virgin powder to the powder-processing system; wherein the pneumatic powder transfer system includes at least a container for the virgin powder, and a first compressed gas supply line to supply gas for fluidizing and transporting the virgin powder from the container. The method is a method for producing a bed of powder in the process chamber of a laser sintering machine in which a three-dimensional article is formed in layerwise fashion comprising the steps of: pneumatically feeding a virgin powder from a virgin powder container into a powder processing unit; pneumatically feeding powder from the powder processing unit into a feed hopper in the laser sintering machine; depositing a first portion of powder from the feed hopper into the process chamber and across a target area from a first side to an opposing second side; and depositing a second portion of powder across the target area in the process chamber from the second side to the first side; wherein the step of pneumatically feeding a virgin powder from a virgin powder container into a powder processing unit comprises the steps of: fluidizing the virgin powder in the virgin powder container with a first flow rate of a first supply of compressed gas; intermittently pressurizing the container with a second higher flow rate of the first supply of compressed gas and removing a fluidized stream of the powder from a bottom outlet of the powder container.

Further aspects, features and advantages are achieved by the present invention by providing an apparatus for producing three-dimensional articles from a powder including at least a process chamber within the apparatus in which a layerwise build process is performed to produce three-dimensional objects; a feed line into the apparatus for feeding powder into the process chamber; and a pneumatic powder transfer system connected to the feed line for transporting virgin powder into the process chamber; wherein the pneumatic powder transfer system includes at least a container for the virgin powder and a first compressed gas supply line to supply gas for fluidizing and transporting the virgin powder from the container. This involves a method for producing a bed of powder in the process chamber of a laser sintering machine in which a three-dimensional article is formed in layerwise fashion comprising the steps of: pneumatically feeding a virgin powder from a virgin powder container into a feed hopper in the laser sintering machine; depositing a first portion of powder from the feed hopper into the process chamber and across a target area from a first side to an opposing second side; and depositing a second portion of powder across the target area in the process chamber from the second side to the first side; wherein the step of pneumatically feeding a virgin powder from a virgin powder container into a feed hopper in the laser sintering machine comprises the steps of; fluidizing the virgin powder in the virgin powder container with a first flow rate of a first supply of compressed gas; intermittently pressurizing the container with a second higher flow rate of the first supply of compressed gas and removing a fluidized stream of the powder from a bottom outlet of the powder container.

DESCRIPTION OF DRAWINGS

These and other aspects, features and advantages of the invention will become apparent upon consideration of the following detailed disclosure of the invention, especially when taken in conjunction with the following drawings wherein.

DETAILED DESCRIPTION OF THE INVENTION

Figure 1:
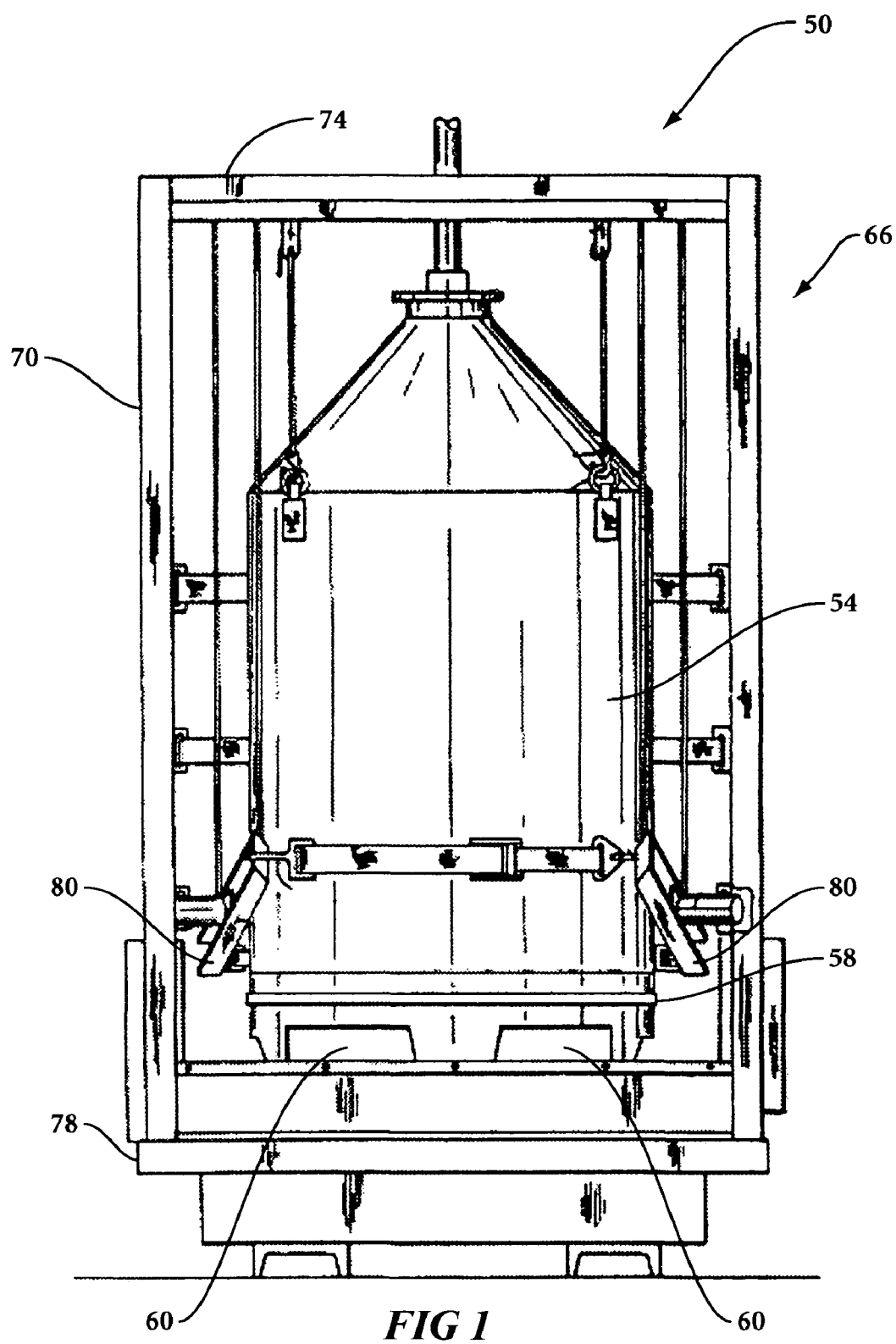
FIG. 1 is a diagrammatic view of a container unloading system of the prior art.

FIG. 1 illustrates, by way of background, a prior art flexible container unloading system, as described in U.S. Pat. No. 5,271,439. The system, represented generally by the numeral 50, includes a flexible bag 54 that is sealably attached to a substantially rigid base 58 of a water impervious synthetic resin. The base has a plurality of openings 60 for receiving the tines of a forklift (not shown) for transporting the bag-base combination.

A porous diaphragm (not shown) covers the upper surface of base 58 and is secured to the outer periphery of the base. The diaphragm overlies the base, such that a plenum is defined between the diaphragm and the base. Compressed gas introduced into the plenum through a compressed gas line attached to an inlet (not shown) in the base 58, passes through the porous diaphragm and into flexible bag 54 where it fluidizes the powder contained in the bag. A frame, indicated generally at 66, is made up of a plurality of frame members including side frame members 70 and top frame members 74 which form a tall rectangular superstructure for supporting the flexible wall bag 54. A platform 78 on which base 58 rests is sloped forwardly to facilitate flow of material from the container through a bottom outlet (not shown) of base 58. Mechanical arms 80 on each side of flexible bag 54 are equipped with a vibrating function and can be moved inward to squeeze flexible bag 54. The combination of vibration and mechanical squeezing is used to facilitate the movement of powders toward the bottom of bag 54 and out the bottom outlet.

Figure 2:
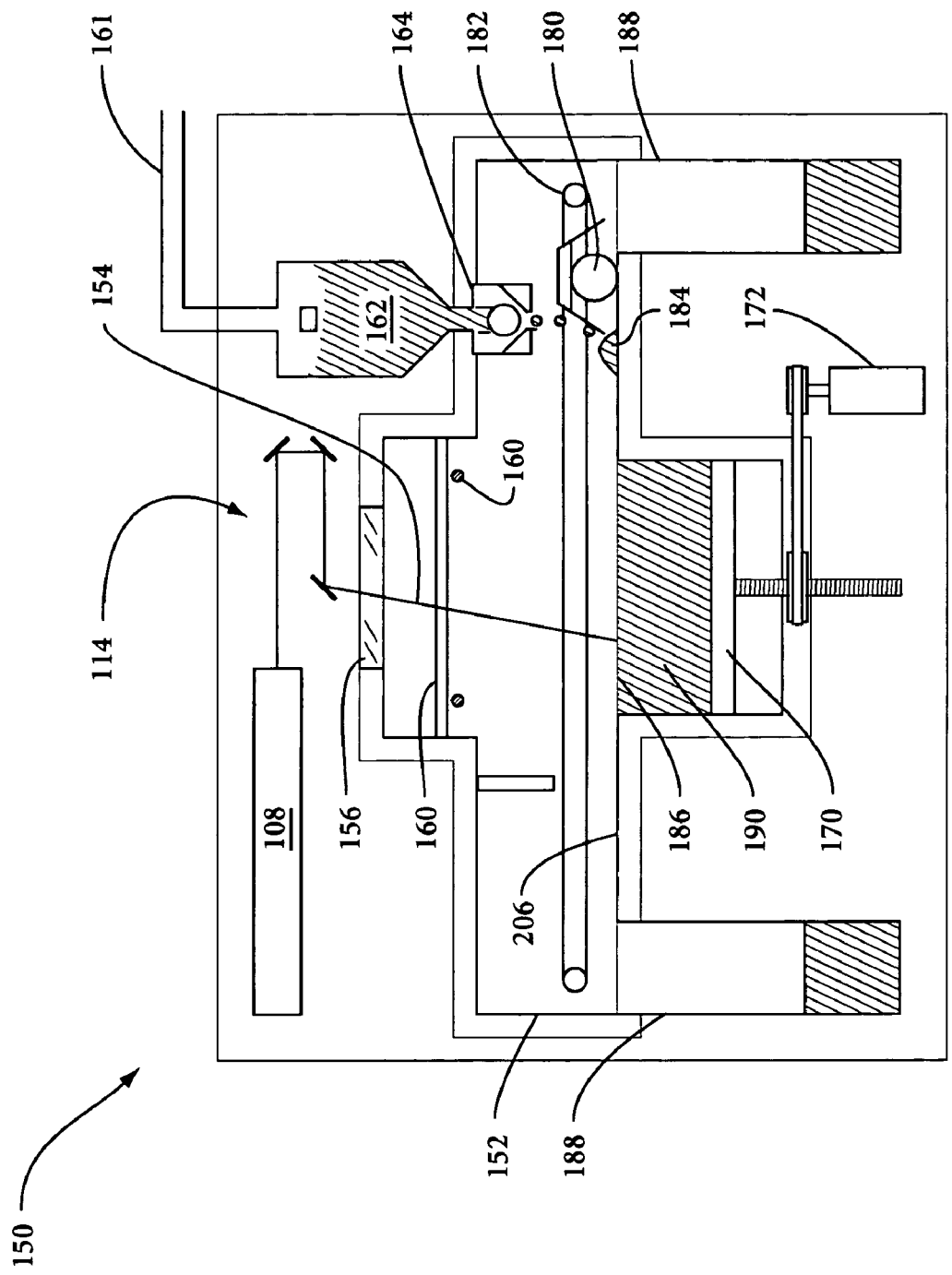
FIG. 2 is a diagrammatic front elevation view of a laser sintering machine.

A laser sintering system for producing 3-dimensional articles is shown in FIG. 2 and represented generally by the numeral 150. A carbon dioxide laser 108 and its associated scanning system 114 is shown mounted in a unit above a process chamber 152 that includes a top target area 186 of powder bed 190, and a spreading roller 180. The process chamber 152 maintains the appropriate temperature and atmospheric composition (typically an inert atmosphere such as nitrogen) for the fabrication of the article.

A feed hopper 162 and 164 is used to periodically deposit powder 184 onto process chamber floor 206 where it is spread by counter-rotating roller 180 that is moved in reciprocating fashion by drive system 182. A feed line 161 feeds powder into the laser sintering system where it enters the top section of feed hopper 162. The method for depositing and spreading powder in both directions in this approach is described completely in U.S. patent application Ser. No. 10/856,303, assigned to the assignee of the present invention and hereby specifically incorporated by reference into this application.

Operation of the selective laser sintering system of FIG. 2 is automated. A laser beam 154 is generated by laser 108, and aimed at target area 186 by way of optics-mirror scanning system 114, generally including galvanometer-driven mirrors that deflect the laser beam. The laser and galvanometer systems are isolated from the hot process chamber 152 by a laser window 156. The laser window 156 is situated within the periphery formed by radiant heater elements 160 that heat the target area 186 of the part bed below. These heater elements 160 may be ring shaped (rectangular or circular) panels or radiant heater rods that are arrayed about the laser window 156. The deflection of the laser beam 154 is controlled in combination with modulation of laser 108 itself, to direct laser energy to those locations of the fusible powder layer in the target area 186 on the exposed surface of the part cake 190 corresponding to the cross-section of the article to be formed in that layer. Scanning system 114 may scan the laser beam 154 across the powder in a raster-scan fashion, or in vector fashion. Once the cross-section is formed the part cake 190 is lowered one layer thickness by the drive system 172 lowering support platform 170 on which is the part cake 190.

There are three basic categories of powder used in a selective laser sintering system. Virgin powder refers to fresh powder fed to a system. Overflow powder is the excess powder pushed out of the build chamber, such as the powder in containers 188 in FIG. 2. Recovered powder is powder recovered outside the build or process chamber when the manufactured parts in the part cake are removed from the system. Such recovered powder is collected and recovered outside of the laser sintering machine in a device usually referred to as a breakout station.

Figure 3:
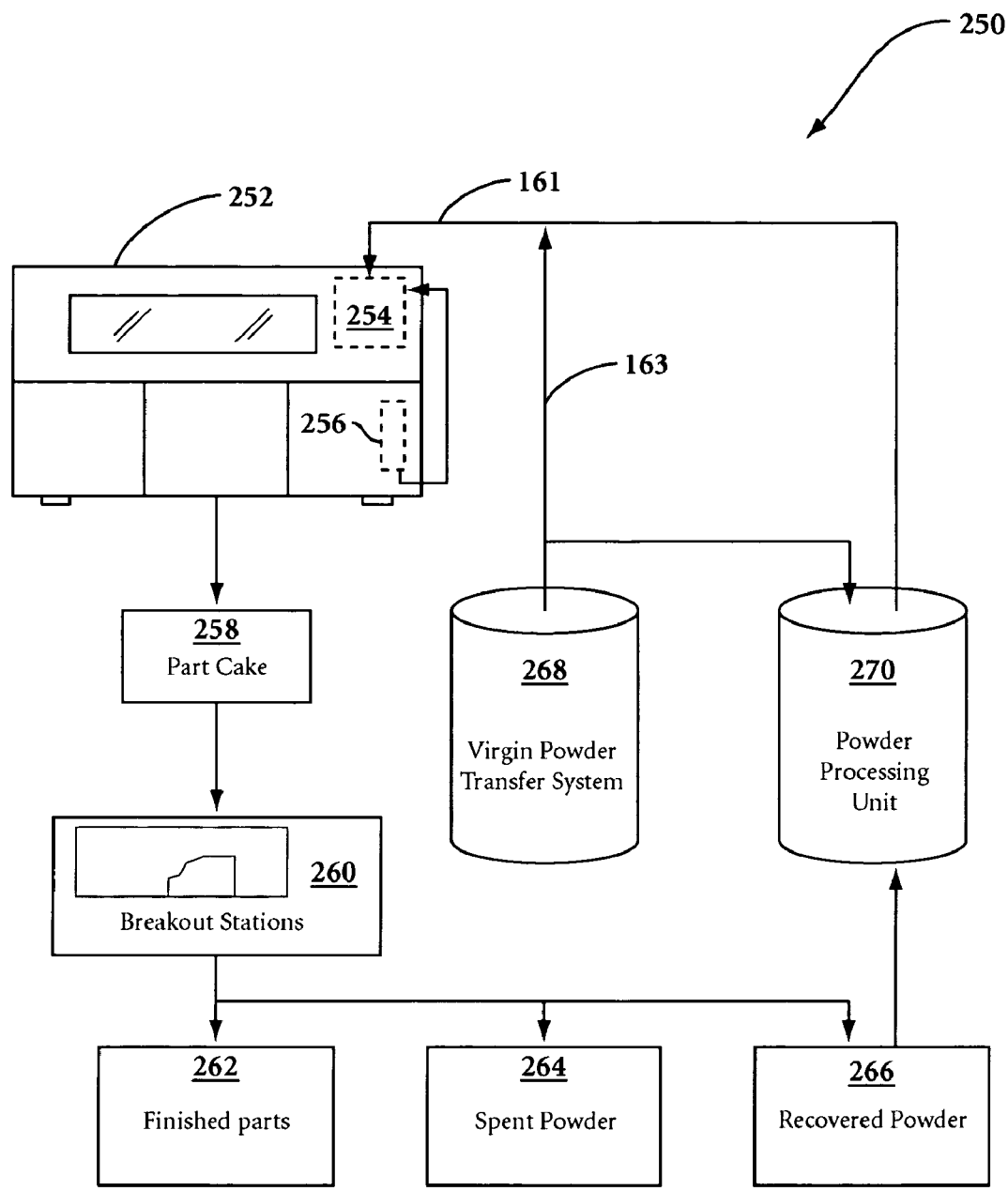
FIG. 3 is a schematic overview of a powder recycle system used with a laser sintering system.

A compact and reliable automated system for feeding, removing and recycling powders to laser sintering systems is shown in FIG. 3 and represented generally by the numeral 250. This system is described in the aforementioned patent application Ser. No. 11/077,304. One or more laser sintering machines 252, similar to that described in FIG. 2, are equipped with a feed hopper 254 and one or more overflow containers 256. Not shown in FIG. 3, is a dense phase transporter located within laser sintering machine 252 which transfers overflow powder from container 256 back to feed hopper 254, eliminating a significant powder-handling load from the external powder processing unit 270. At the completion of builds in machine 252 a part cake 258, which consists of the fabricated parts and the unfused powder around those parts, is moved to break-out station 260. Here the separation of part cake 258 into finished parts 262, lower quality or spent powder 264, and recovered powder 266 for recycle is accomplished mechanically. Spent powder is normally composed of larger hard agglomerates created by powder close to the hot parts. Spent powder is not suitable for recycle and is discarded. A dense phase transporter (not shown) then transports recovered powder 266 to powder processing unit 270 where it is combined with new powder 268 to be fed back to the machine feed hopper 254. Alternately, the system can be used to feed virgin powder directly to a laser sintering machine if desired via line 163. The powder processing unit 270 provides the function of blending and feeding a desired mixture of virgin and recovered powder for laser sintering and a typical one is described in more detail in the aforementioned patent application Ser. No. 11/077,304. Feed line 161 corresponds to feed line 161 in FIG. 2. Not shown is the network of gas piping and controls that drive the dense phase pneumatic transfers throughout the system.

The bulk feeding of new powder into the system is represented by the virgin (new) powder feeder 268. The instant invention employs a pneumatic powder transfer system and a contained and automated bulk powder unloading system that is reliable, mechanically simple, and cost effective. The powder transfer system employs a container for the virgin powder that can be stationary or portable and reusable. The stationary container is filled in place. Preferably the container is portable and reusable. It is filled by a powder supplier and shipped to a location where it is connected to the user's laser sintering system and to a supply of compressed air. After use it is returned for refill.

Figure 4:
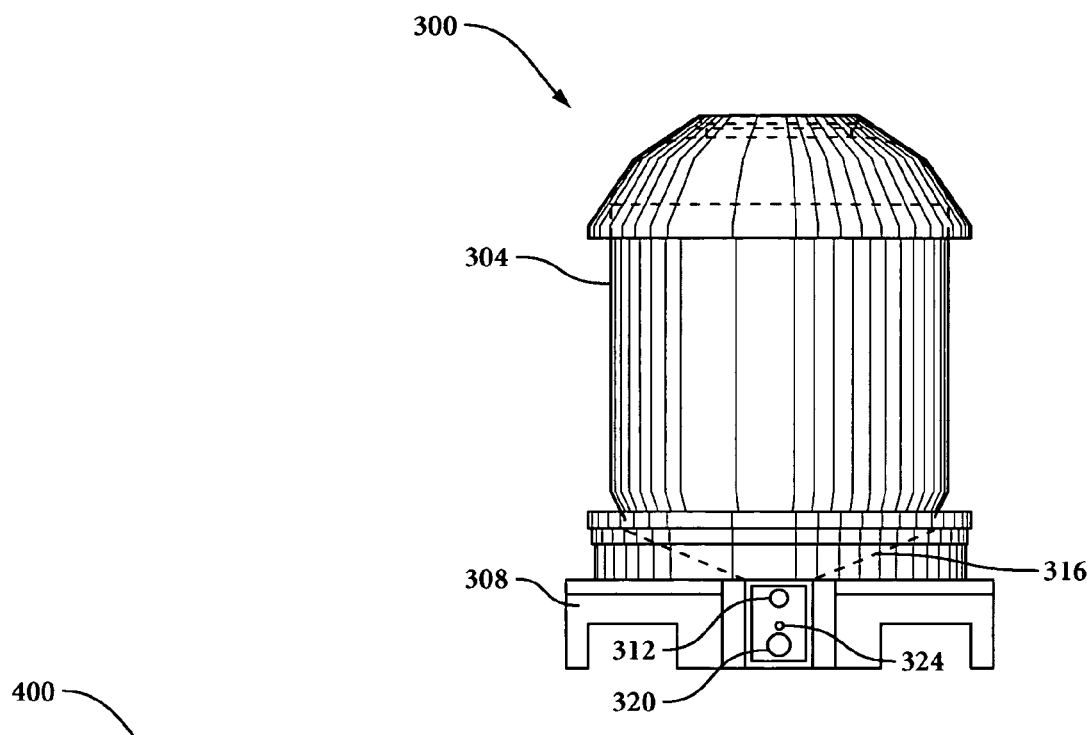
FIG. 4 is a diagrammatic front elevation view of the pneumatic powder transfer system of the instant invention.

FIG. 4, represented generally by the numeral 300, is a pneumatic powder transfer system of the instant invention. As shown in FIG. 4 the pneumatic powder transfer system consists of a container 304 and a substantially rigid base 308. The illustrated structure of two separate elements (a container 304 and a base 308) is not a requirement of the instant invention in that it can also be of a one-piece construction. However, a two piece structure as shown allows the possibility of keeping a base 308 in place and shipping the container 304 after use to have it refilled. Container 304 can also be a flexible and collapsible bag that can be collapsed into the base to enable more compact shipping for refilling. Container 304 can also be a substantially rigid container. Generally, container 304 has a porous diaphragm (not shown) that covers an upper surface of base 308 and is secured to the outer periphery of the base. The diaphragm overlies the base, such that a plenum is defined between the diaphragm and the base. Compressed gas introduced into port 312 in base 308 flows into the plenum and passes through the porous diaphragm and into container 304 where it partially or completely fluidizes the material forming the load. As shown by the dotted line 316 base 308 and the bottom of container 304 form an inclined slope that induces fluidized powder to flow down toward the center of container 308 to an outlet that exits from port 320 from base 308 rather than toward one side as has been done previously. Unlike the prior art system of FIG. 1 container 304 does not have a top vent so the compressed fluidizing gas entering through port 312 not only fluidizes the contained powder but slightly pressurizes the container and thereby provides the driving force to transport powder out of outlet port 320, which is the only exit point for the compressed gas. Additional compressed gas input port 324 in base 308 is available to further augment flow as will be clearer in FIG. 5.

Figure 5:
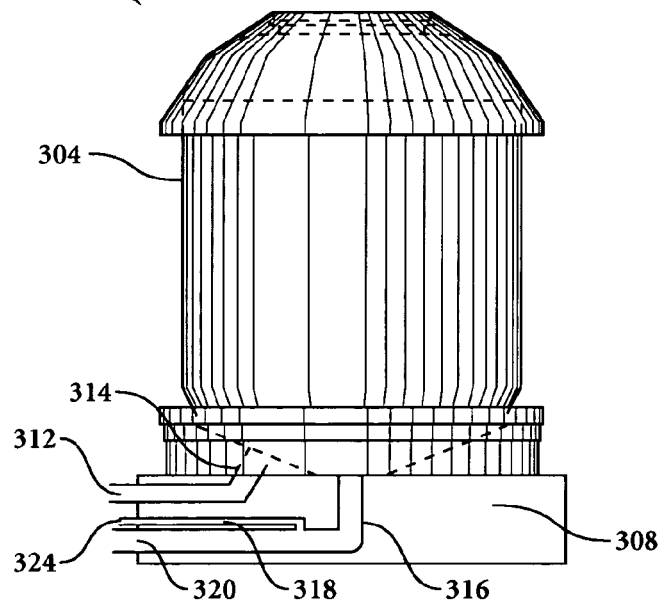
FIG. 5 is a diagrammatic side elevation view of the pneumatic powder transfer system of the instant invention.

FIG. 5 is a side view of the pneumatic powder transfer system of FIG. 4, represented generally by the numeral 400. As was shown in FIG. 4 the pneumatic powder transfer system consists of a container 304 and a substantially rigid base 308. Having two separate elements (a container 304 and a base 308) is not a requirement of the instant invention in that it can also be of a one-piece construction. Inlet port 312 in base 308 is the access point for connecting a compressed gas supply that feeds fluidizing gas through line 314 to the plenum (not shown) formed between a porous diaphragm and base 308. The compressed fluidizing gas creates enough pressure in container 304 to drive fluidized powder into exit line 316, which exits base 308 at outlet port 320. Inlet port 324 provides additional compressed gas via line 318 to exit line 316 to provide supplemental conveying gas when needed.

Figure 6:
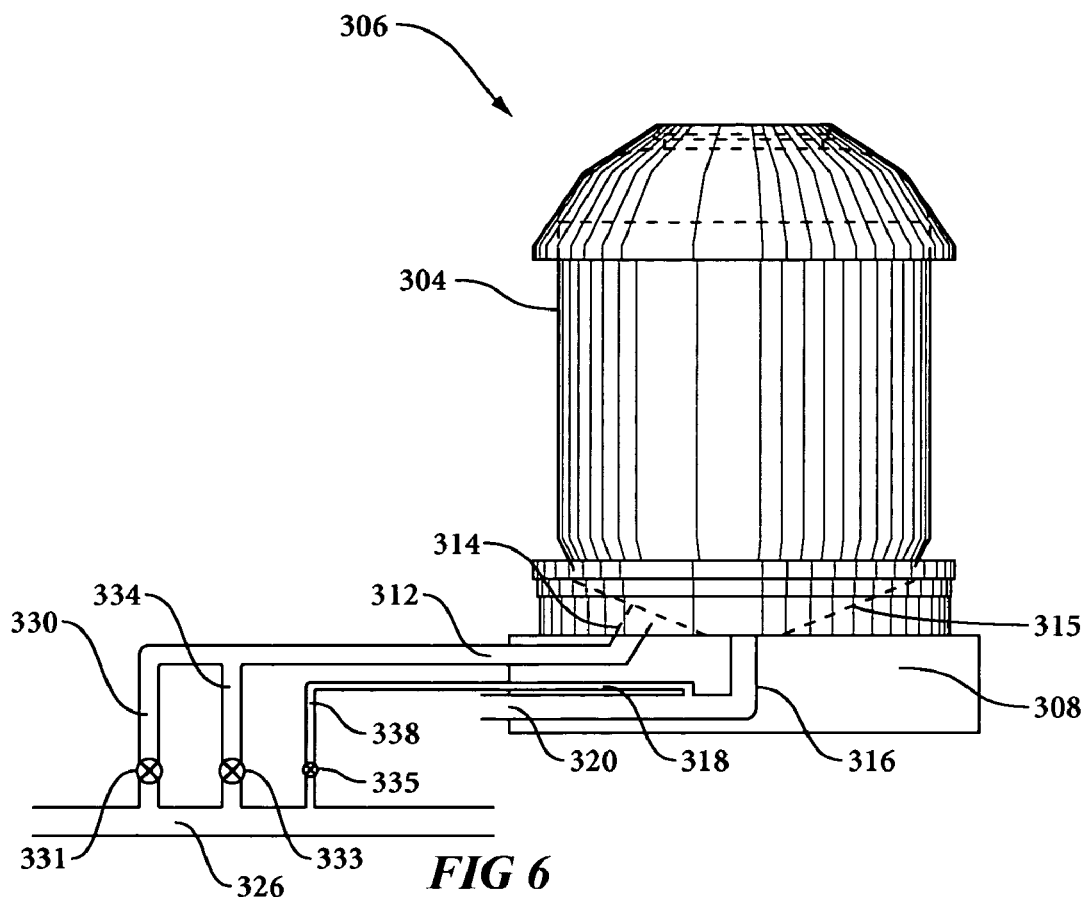
FIG. 6 is a second diagrammatic side elevation view of the pneumatic powder transfer system of the instant invention.

Another aspect of the instant invention is an intermittent cyclic boost of the compressed gas input into inlet port 312. Generally indicated by the numeral 306 in FIG. 6 is another side view of the shipping and unloading system shown in FIG. 5. A source of compressed gas 326 provides gas through lines 330 and 334 to inlet port 312. Valves 331 and 333 can be manually operated or automatically via a computer controlled system. In operation valve 331 and line 330 provide a steady supply of fluidizing gas to inlet port 312 and through line 314 to fluidize powder in container 304. For the majority of the time this fluidizing gas is sufficient to move powder smoothly from container 304 and out of the system through outlet port 320. During this time valve 333 is closed. When powder transfer is restricted due to a blockage or slows as the container is almost emptied valve 333 can be opened and pulsed gas flowed through line 334 to increase fluidization as well as increase pressure in container 304. The volume of pulsed gas is significantly higher than the normal fluidizing gas delivered through line 330. A feedback pressure control system (not shown) can be used to regulate valve 333 or it can be controlled manually. Alternately the pulsed gas system could have the structure of only one valve 331 which normally supplies fluidizing gas and occasionally supplies pulsed gas by opening much wider. Supplemental conveying gas line 338, controlled by valve 335, is also used to control the ratio of solids to air in the exit conveying line 316. The supplemental conveying gas dilutes the fluidized powder and improves flow. It has been found that the combination of the sloped container bottom 315, normal fluidizing gas from line 330, occasional pulsed gas from line 334, and occasional supplemental conveying gas from line 338 is sufficient to efficiently transfer powder from the pneumatic powder transfer system without the need for a tilting stand, or vibration or mechanically squeezing as described in the prior art.

Figure 7:
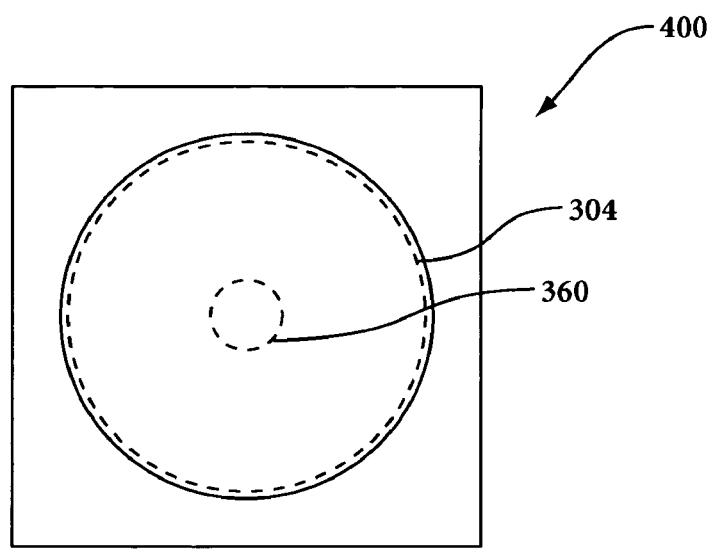
FIG. 7 is a diagrammatic top elevation view of the pneumatic powder transfer system of the instant invention.

FIG. 7 is a top view of the pneumatic powder transfer system container to show that the bottom outlet 360 of the container is centered to enable uniform flowing of the fluidized powder out of the container. Outlet 360 is connected to line 316 of FIG. 6. Viewing both outlet 360 of FIG. 7 and the sloped bottom 315 of FIG. 6 defines a bottom of the container that is sloped downwardly toward a centered outlet. In the prior art device of FIG. 1 the bottom outlet is located on the side of the container rather than the in the center. A side exit has been found to be functional in conjunction with the instant invention, but a center exit design is a preferred embodiment to achieve more complete emptying of the container 304 even when employed with a tilting stand, or vibration and/or mechanical squeezing.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

The invention claimed is:

1. An apparatus for producing three-dimensional articles from a powder comprising:
    (a) a process chamber within the apparatus in which a layerwise build process is performed to produce three-dimensional objects;
    (b) a feed line into the apparatus for feeding powder into the process chamber;
    (c) a powder-processing unit connected to the feed line; and
    (d) a pneumatic powder transfer system connected to the powder-processing unit for transporting virgin powder to the powder-processing system; wherein the pneumatic powder transfer system comprises:
        i. a container for the virgin powder, said container having an inlet port located in the bottom region of the container for introducing compressed gas into the container and an outlet port located in the bottom center for removing fluidized virgin powder from the container;
        ii. a first compressed gas supply line to supply gas for fluidizing and transporting the virgin powder from the container through the outlet port; and
        iii. a line for connecting the outlet port to the powder-process unit.

2. The apparatus of claim 1 further comprising a second compressed gas supply line located in the bottom region of the container to supply compressed gas for supplemental transporting of the virgin powder from the container.

3. The apparatus of claim 1 wherein the container for virgin powder includes a substantially rigid base sealably fastened thereto.

4. The apparatus of claim 3 wherein the first compressed gas supply line is connected to the substantially rigid base for supplying compressed gas to the interior of the container for the virgin powder for fluidizing and transporting the virgin powder from the container.

5. The apparatus of claim 4 further comprising a second compressed gas supply line connected to the substantially rigid base for supplying compressed gas for supplemental transporting of the virgin powder from the container.

6. The apparatus of claim 3 wherein the container for the virgin powder is a flexible and collapsible bag sealably fastened to the substantially rigid base.

7. The apparatus of claim 3 wherein the container for the virgin powder is a rigid container sealably fastened to the substantially rigid base.

8. The apparatus of claim 1 wherein the bottom of the container is sloped downwardly toward the centered outlet.

9. An apparatus for producing three-dimensional articles from a powder comprising:
   (a) a process chamber within the apparatus in which a layerwise build process is performed to produce three-dimensional objects;
   (b) a feed line into the apparatus for feeding powder into the process chamber; and
   (c) a pneumatic powder transfer system connected to the feed line for transporting virgin powder into the process chamber; wherein the pneumatic powder transfer system comprises:
      i. a container for the virgin powder, said container having an inlet port located in the bottom region of the container for introducing compressed gas into the container and an outlet port located in the bottom center for removing fluidized virgin powder from the container;
      ii. a first compressed gas supply line to supply gas for fluidizing and transporting the virgin powder from the container through the outlet port; and
      iii. a line for connecting the outlet port to the process chamber.

10. The apparatus of claim 9 further comprising a second compressed gas supply line located in the bottom region of the container to supply compressed gas for supplemental transporting of the virgin powder from the container.

11. The apparatus of claim 9 wherein the container for virgin powder includes a substantially rigid base scalably fastened thereto.

12. The apparatus of claim 11 wherein the container for the virgin powder is a rigid container sealably fastened to the substantially rigid base.

13. The apparatus of claim 11 wherein the container for the virgin powder is a flexible and collapsible bag sealably fastened to the substantially rigid base.

14. The apparatus of claim 11 wherein the first compressed gas supply line is connected to the substantially rigid base for supplying compressed gas to the interior of the container for the virgin powder for fluidizing and transporting the virgin powder from the container.

15. The apparatus of claim 14 further comprising a second compressed gas supply line connected to the substantially rigid base for supplying compressed gas for supplemental transporting of the virgin powder from the container.

16. The apparatus of claim 11 wherein the container for the virgin powder is a flexible and collapsible bag.

17. The apparatus of claim 9 wherein the bottom of the container is sloped downwardly toward the centered outlet.

* * * * *

UNITED STATES PATENT AND TRADEMARK OFFICE
CERTIFICATE OF CORRECTION

PATENT NO. : 7,296,599 B2  Page 1 of 1
APPLICATION NO. : 11/096143
DATED : November 20, 2007
INVENTOR(S) : Brian D. Cox It is certified that error appears in the above-identified patent and that said Letters Patent is hereby corrected as shown below:

In the Claims:

Claim 11 at Column 10, line 9: delete "scalably" and insert -- sealably --

Signed and Sealed this

Twenty-ninth Day of April, 2008

JON W. DUDAS
*Director of the United States Patent and Trademark Office*